(12) United States Patent
Choo et al.

(10) Patent No.: US 9,906,767 B2
(45) Date of Patent: Feb. 27, 2018

(54) APPARATUS AND METHOD FOR DIGITAL HOLOGRAPHIC TABLE TOP DISPLAY

(71) Applicant: Electronics and Telecommunications Research Institute, Daejeon-si (KR)

(72) Inventors: Hyon Gon Choo, Daejeon-si (KR); Soo Hyun Lee, Daejeon-si (KR); Jin Woong Kim, Daejeon-si (KR); Kyung Ae Moon, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 14/882,632

(22) Filed: Oct. 14, 2015

(65) Prior Publication Data

US 2016/0105658 A1 Apr. 14, 2016

(30) Foreign Application Priority Data

Oct. 14, 2014 (KR) .......................... 10-2014-0138429

(51) Int. Cl.
*H04N 5/89* (2006.01)
*H04N 13/00* (2018.01)
*G02B 27/00* (2006.01)
*G06F 3/01* (2006.01)
*G03H 1/22* (2006.01)

(52) U.S. Cl.
CPC ..... *H04N 13/0018* (2013.01); *G02B 27/0093* (2013.01); *G03H 1/2294* (2013.01); *G06F 3/013* (2013.01); *G03H 2001/2236* (2013.01); *G03H 2001/2242* (2013.01); *G03H 2210/36* (2013.01); *G03H 2225/10* (2013.01); *G03H 2225/60* (2013.01)

(58) Field of Classification Search
CPC .... H04N 5/89; H04N 13/0018; G03H 1/2294; G03H 2225/10; G03H 2225/60; G03H 2001/2242; G03H 2001/2236; G03H 2210/36; G06F 3/013; G02B 27/0093
See application file for complete search history.

(56) References Cited

U.S. PATENT DOCUMENTS 6,665,003 B1 * 12/2003 Peleg .................... G06T 3/4038
348/36
8,294,965 B2 10/2012 Buschbeck et al.
(Continued)

FOREIGN PATENT DOCUMENTS

JP 2010529483 A 8/2010
JP 2011259373 A 12/2011
(Continued)

*Primary Examiner* — Tat C Chio
(74) *Attorney, Agent, or Firm* — William Park & Associates Ltd.

(57) ABSTRACT

Disclosed is an apparatus and method for digital holographic table top display. The digital holographic table top display apparatus includes: a camera array configured to capture a plurality of channel images in an omni-directional range from a table by using a plurality of cameras; a controller configured to detect an observer from the plurality of channel images and to track a position of pupils of the observer in at least one channel image from which the observer is detected; and a display configured to reproduce a digital holographic image in a three-dimensional (3D) space according to the tracked position of the pupils.

14 Claims, 6 Drawing Sheets

(56) References Cited

U.S. PATENT DOCUMENTS

| | | |
|---|---|---|
| 8,446,654 B2 | 5/2013 | Buschbeck |
| 2011/0304614 A1 | 12/2011 | Yasunaga |
| 2014/0192146 A1 | 7/2014 | Park et al. |
| 2014/0375760 A1* | 12/2014 | Lee .................... H04N 5/23238 348/36 |

FOREIGN PATENT DOCUMENTS

| | | |
|---|---|---|
| KR | 1020040079164 A | 9/2004 |
| KR | 1020110076723 A | 7/2011 |
| KR | 1020120029128 A | 3/2012 |
| KR | 101177408 B1 | 8/2012 |
| KR | 101286965 B1 | 7/2013 |
| KR | 101311463 B1 | 9/2013 |
| KR | 1020140090838 A | 7/2014 |

\* cited by examiner

APPARATUS AND METHOD FOR DIGITAL HOLOGRAPHIC TABLE TOP DISPLAY

CROSS-REFERENCE TO RELATED APPLICATION(S)

This application claims priority from Korean Patent Application No. 10-2014-0138429, filed on Oct. 14, 2014, in the Korean Intellectual Property Office, the entire disclosure of which is incorporated herein by reference for all purposes.

BACKGROUND

1. Field

The following description relates to a three dimensional display technology.

2. Description of the Related Art

Three-dimensional (3D) images currently displayed through a two-dimensional (2D) screen are different from real 3D images. There is a technical challenge in that motion parallax is not seamless as a real image, such that when an image is viewed from a different angle, a user may not see other sides viewed at the different angle. Further, when an observer focuses on an object in a 3D space, an image should be provided in a manner that enables the observer to see the object without feeling fatigue.

However, the existing 2D screen based approach may not be suitable for a 3D image reproduction method that may overcome the above challenge and satisfy the need. Super multi-view images and the like may be used as a substitute, but only the holographic images are optimal to provide perfect 3D images.

SUMMARY

Provided is an apparatus and method for digital holographic table top display, in which a digital holographic image is provided at any direction around 360 degrees according to the position of pupils of an observer, thereby expanding a field of view.

In one general aspect, there is provided a digital holographic table top display apparatus, including: a camera array configured to capture a plurality of channel images in an omni-directional range from a table by using a plurality of cameras; a controller configured to detect an observer from the plurality of channel images and to track a position of pupils of the observer in at least one channel image from which the observer is detected; and a display configured to reproduce a digital holographic image in a three-dimensional (3D) space according to the tracked position of the pupils.

The camera array of the plurality of cameras may be arranged in a circle toward a center of the table to acquire images around 360 degrees.

The controller may include: a multi-grid image generator configured to combine the channel images captured by the plurality of cameras to generate one multi-grid image; an observer detector configured to detect at least one observer from the multi-grid image; a channel determiner configured to select a channel associated with a channel image from which the observer is detected; a pupil tracker configured to track the position of the pupils in the channel image associated with information on the selected channel; and a coordinate calculator configured to calculate 3D coordinates of the position of the pupils by using the tracked position of the pupils and the information on the selected channel.

The observer detector may extract location information on an additional channel area from the multi-grid image having the at least one channel image from which the observer is detected, and transmits the extracted location information on the additional channel area along with the channel information to the channel determiner.

The location information on the additional channel area may be location information on a face area or location information on a face area and an eye area.

With respect to one multi-grid image having the at least one channel image from which an observer is detected, the channel determiner may transmit, to the pupil tracker, an original channel image captured by the plurality of cameras, or an enlarged image from the at least one channel image.

The coordinate calculator may calculate 3D coordinates of the position of each of the pupils tracked in the channel images captured by two adjacent stereo cameras, and may convert the calculated 3D coordinates of the position of each of the pupils on the basis of a predetermined reference point.

The predetermined reference point may be the center of the table.

The display may include an optical device configured to form a viewing window by controlling a direction of a beam to be directed to the position of the pupils tracked by the controller, and to reproduce the digital holographic image through the formed viewing window.

In another general aspect, there is provided a digital holographic table top display method, including: capturing a plurality of channel images in an omni-directional range from a table by using a camera array that includes a plurality of cameras; detecting an observer from the plurality of channel images and tracking a position of pupils of the observer in at least one channel image from which the observer is detected; and reproducing a digital holographic image in a three-dimensional (3D) space according to the tracked position of the pupils.

The tracking of the position of the pupils may include: generating one multi-grid image by combining the channel images captured by the plurality of cameras; detecting at least one observer from the multi-grid image; selecting a channel associated with a channel image from which the observer is detected; tracking the position of the pupils in the channel image associated with information on the selected channel; and calculating 3D coordinates of the position of the pupils by using the tracked position of the pupils and the information on the selected channel.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Terms used throughout this specification are defined in consideration of functions according to exemplary embodiments, and can be varied according to a purpose of a user or manager, or precedent and so on. Therefore, definitions of the terms should be made on the basis of the overall context.

Figure 1A:
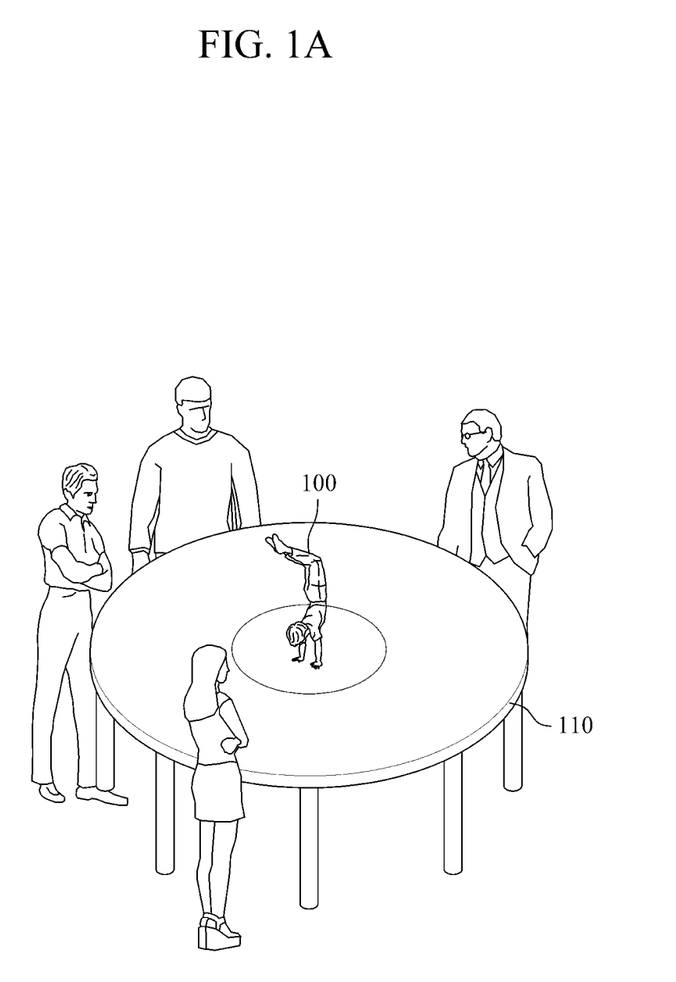
FIG. 1A is a conceptual diagram illustrating a digital holographic table top display according to an embodiment.
Figure 1B:
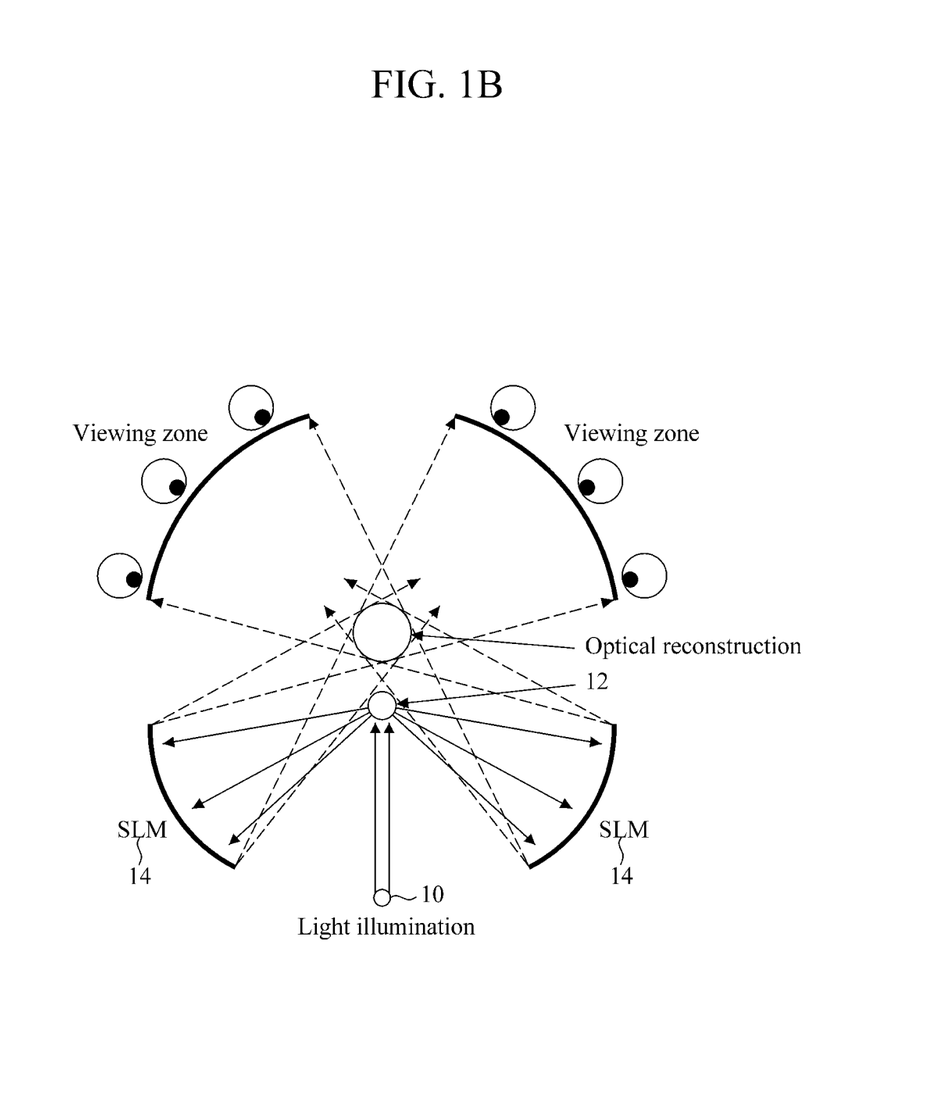
FIG. 1B is a diagram illustrating a method of configuring a digital holographic table top display according to an embodiment.

FIG. 1A is a conceptual diagram illustrating a digital holographic table top display according to an embodiment, and FIG. 1B is a diagram illustrating a method of configuring a digital holographic table top display according to an embodiment.

Referring to FIGS. 1A to 1B, in the digital holographic table top display technology, a holographic image may be reproduced in a 3D space by light diffraction of a light source 10 using a spatial light modulator (SLM) 14. The holographic table top display outputs a holographic image 100 in a 3D space on a plane table 110 as illustrated in FIG. 1A, so that at least one observer may view a 3D image at any direction around 360 degrees. The holographic 3D image 100 is an image reproduced by reconstructing a holographic image using the SLM 14.

With respect to an optical structure of the holographic table top display, a light diffraction angle of the light source 10 is controlled by using optical components, such as an parabolic mirror 12 and the like as illustrated in FIG. 1B, to provide a floating image effect in the air. The light source 10 may be a coherent light source such as a laser, or a partially coherent light source such as a light emitting diode (LED).

The holographic table top display is based on the light source and the SLM 14 as in other holographic displays. For this reason, the pixel size (or pixel pitch) of the SLM 14 limits the viewing zone of an observer. In order to overcome the limitation, a method is required to adjust directions of output light by using the light source 10 and the SLM 14 according to the position of pupils of an observer. In the present disclosure, pupils of an observer may be accurately detected in a 3D space, and a digital holographic image may be reproduced in the 3D space according to the detected position of pupils, thereby overcoming a limited viewing zone.

Figure 2:
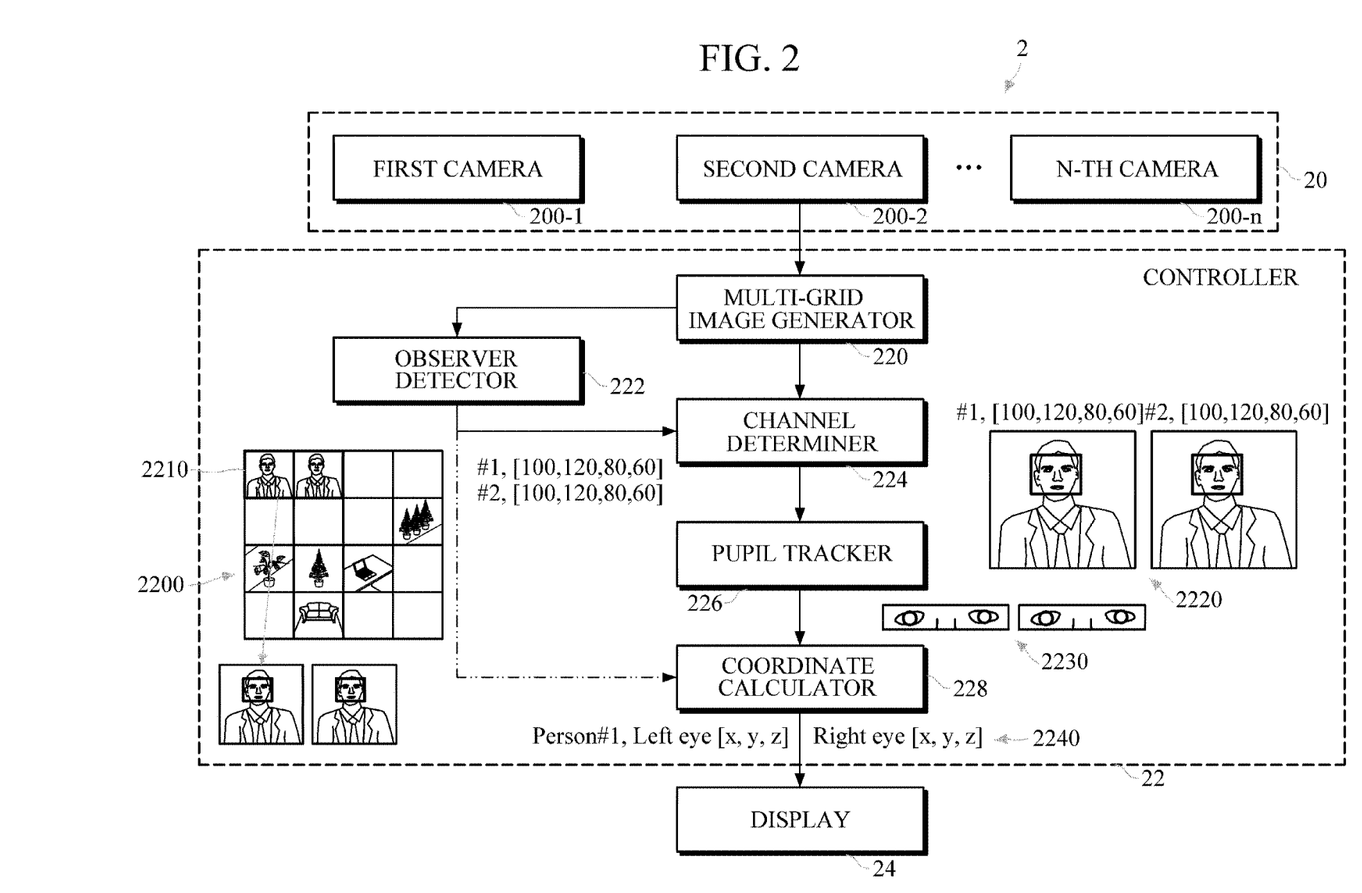
FIG. 2 is a block diagram illustrating a digital holographic table top display apparatus according to an embodiment.

FIG. 2 is a block diagram illustrating a digital holographic table top display apparatus (hereinafter referred to as a "display apparatus") according to an embodiment.

Referring to FIG. 2, the display apparatus 2 includes a camera array 20 including a plurality of cameras 200-1, 200-2, . . . , and 200-n, a controller 22, and a display 24.

The camera array 20 captures a plurality of channel images in an omni-directional range from a table by using the plurality of cameras 200-1, 200-2, . . . , and 200-n. The camera array 20 may enable images to be captured around 360 degrees by using the plurality of cameras 200-1, 200-2, . . . , and 200-n that are arranged in a circle toward the center of the table. For example, images may be captured by 16 cameras arranged in a ring shape around the table. Each of the cameras 200-1, 200-2, . . . , and 200-n may include channel information. The cameras 200-1, 200-2, . . . , and 200-n may be arranged at a regular interval or at a regular angle, or may be concentrated on a specific area depending on operating environments.

The position of pupils may be detected by using both an omnidirectional camera that allows 360 degree observation and a camera array arranged around a table. However, the above method requires a separate camera input channel, and a correlation between the omnidirectional camera and the camera array is required to be calculated again. Further, distortion occurring in an omnidirectional camera leads to an additional calculation to compensate for the distortion. In addition, since the omnidirectional camera is located at a different height from the camera array, face recognition capability of the omnidirectional camera is reduced. However, in the present disclosure, by using only the camera array without the omnidirectional camera, an exact position of pupils may be detected in a 3D space.

The controller 22 detects an observer from a plurality of channel images captured by the cameras 200-1, 200-2, . . . , and 200-n and tracks a position of pupils of the observer in at least one channel image from which the observer is detected. In one exemplary embodiment, the controller 22 includes a multi-grid image generator 220, an observer detector 222, a channel determiner 224, a pupil tracker 226, and a coordinate calculator 228.

The multi-grid image generator 220 generates one multi-grid image 2200 by combining channel images captured by the camera array 20. The multi-grid image generator 220 may scale down channel images captured by the camera array 20 to generate thumbnail images, may combine the generated thumbnail images to generate one multi-grid image 2200 such as 4-channel grid image and 16-channel grid image, and may transmit the generated multi-grid image to the observer detector 222.

The observer detector 222 detects at least one observer from the multi-grid image generated by the multi-grid image generator 220, and transmits channel information regarding the image to the channel determiner 224. For example, in the case of using 16 channels as illustrated in FIG. 2, if an observer is detected from a channel area (a part or grid) #1 and a channel area #2 of the multi-grid image, information on channel areas #1 and #2 is transmitted to the channel determiner 224.

In one exemplary embodiment, the observer detector 222 extracts location information on an additional channel area, from which an observer is detected, and transmits the extracted location information to the channel determiner 224 along with channel information. The location information may be face position information. For example, the observer detector 222 may transmit, to the channel determiner 224, face position information, e.g., information on a location in a square area that is 80 in width and 60 in length from starting points 100 and 120 of channel #1.

In another exemplary embodiment, the observer detector 222 may detect the position of eyes in the case of a multi-grid image that includes channel images, such as a quartered image, which has a specific size. In this case, the observer detector 222 transmits information on the detected position of eyes along with channel information. Although FIG. 2 illustrates an example of detecting an identical observer, different observers may also be detected.

The channel determiner 224 selects a channel associated with a channel area (i.e., channel image) from which an observer is detected by the observer detector 222. That is, the channel determiner 224 transmits, to the pupil tracker 226, only the channel information associated with a channel area, from which an observer is detected, among images transmitted from the observer detector 222. Instead of transmitting information on all the channels, only the channel information associated with areas, from which an observer is detected, is transmitted, thereby improving efficiency in tracking positions of pupils. The channel determiner 224 may transmit information on one or more channels to the pupil tracker 226. For example, information on at least two channels is transmitted per person to generate 3D coordinates of pupils based on a stereo camera.

When selecting channels, the channel determiner 224 has a switching function, which connects an input channel and output channels according to the channel information and a predetermined channel environment. In this case, the channel determiner 224 may transmit, to the pupil tracker 226, an original high-resolution channel image captured by a camera, or an enlarged image from a channel image. In this case, the pupil tracker 226 may track the position of pupils in the high-resolution channel image transmitted from the channel determiner 224.

The pupil tracker 226 tracks the position of pupils by receiving channel images from the channel determiner 224. In the case of receiving additional information associated with location information on a face area or an eye area, the position of pupils is tracked in detail using the location information on a specific area. The pupil tracker 226 transmits the tracked position of the pupils to the coordinate calculator 228 along with channel information. The channel information may be transmitted directly from the observer detector 222 or the channel determiner 224 to the coordinate calculator 228.

In one exemplary embodiment, the pupil tracker 226 tracks the position of pupils in the high-resolution channel image input from the channel determiner 224. In the case where there is location information on a face area calculated by the observer detector 222, a position of an eye area is tracked based on the face area. By contrast, in the case where there is no location information on a face area, a face area is first detected in the same manner as in a method of detecting a face position, and an eye area is detected from the face area; however, in the case where the pupil tracker 226 receives location information on an eye area detected by the observer detector 222, a detailed location of an eye area is detected by using the received location information on an eye area.

In another exemplary embodiment, in the case where there is location information on a face area calculated by the observer detector 222 when the channel determiner 225 selects channels, only the face area of a high-resolution channel image may be transmitted to the pupil tracker 226. In this manner, only the data on a face area may be transmitted, thereby enabling fast detection of location information on an eye area.

A detailed eye position, i.e., pupils, may be detected by a general method used for detecting pupils or eyes. The position of pupils may be detected by using characteristics indicating that pupils are round or oval and characteristics indicating that pupils look darker than surrounding areas when captured by cameras. As an example of using shape characteristics of eyes, a circle detection algorithm that compares accumulated values of brightness differences between surrounding boundaries of the eyes may be indicated by the following Equation 1.

$$\max_{(r,x_0,y_0)} \left| G_\sigma(r) * \frac{\partial}{\partial r} \oint_{r \times x_0, y_0} \frac{I(x, y)}{2\pi r} ds \right|, \quad (1)$$

in which I(x, y) represents a pixel value at (x, y), $(x_0, y_0)$ represents the center of a circle, and r represents a radius. In Equation 1, by adding all the pixel values around the circumference of the circle that is normalized to be $2\pi r$ by radius r from the center $(x_0, y_0)$ of the circle, a pupil area is determined to be an area having the biggest difference between pixel values of an inner circumference and pixel values of an outer circumference, in which Gaussian function G(r) is performed in a direction of radius r so as to remove noise when extracting the position of pupils. In another example, a pupil area is determined by detecting the darkest area by using brightness differences, and by detecting an area that is most similar to a circle in the darkest area. The above methods are merely illustrative, and the present disclosure is not limited thereto.

The coordinate calculator 228 calculates a 3D position of pupils by using channel information of cameras and location information on the detected pupils. The channel information of cameras may be transmitted from the pupil tracker 226, the observer detector 222, or the channel determiner 224. The coordinate calculator 228 may transmit the 3D position of pupils to the display 24.

The display 24 reproduces a digital holographic image in a 3D space according to the position of pupils tracked by the controller 22. The display 24 may include an optical device that forms a viewing window by controlling a beam direction to be directed to the pupil position, and reproduces a digital holographic image through the formed viewing window. The viewing window is a virtual window in an observer area, in which a reconstructed 3D image may be viewed.

Figure 3:
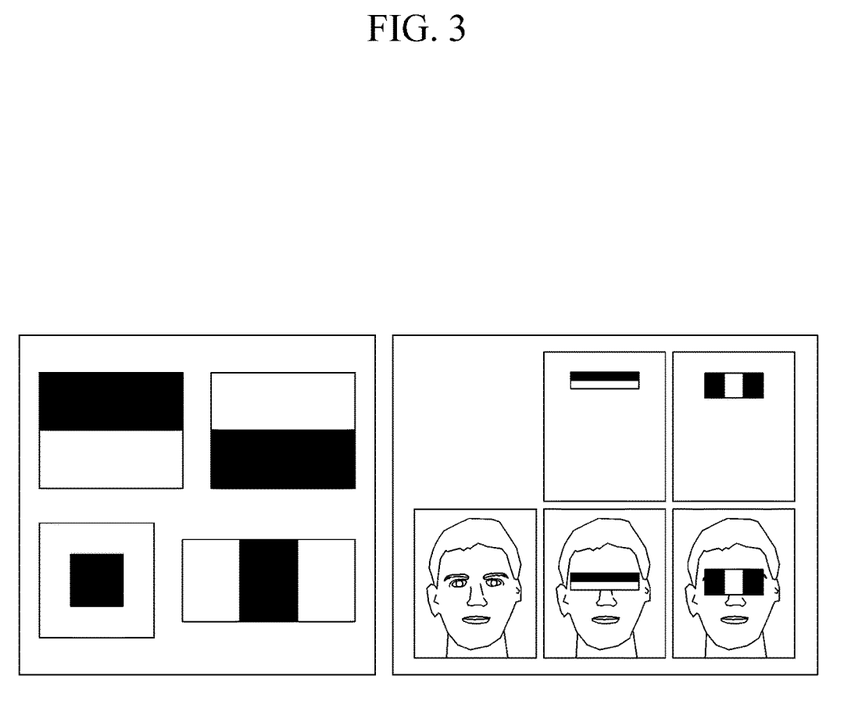
FIG. 3 is a diagram illustrating a face recognition method based on Haar features.

FIG. 3 is a diagram illustrating a face recognition method based on Haar features.

Referring to FIGS. 2 and 3, in one exemplary embodiment, a face recognition method based on Haar features is used to recognize a face. As illustrated in FIG. 3, the method includes generating feature vectors for input images and inputting the feature vectors to a general face classifier to recognize a face.

In another example, if each channel image in a multi-grid image is of a big size, e.g., a four-channel or eight-channel image, an eye area may also be detected. For example, in the case of using a method based on Haar features, similarities may be compared in such a manner that Haar feature vectors are collected again for an area that is recognized as a face and are compared with feature vectors of an eye classifier. However, the above face recognition methods are merely illustrative to assist in understanding the present disclosure, and any general method for face recognition may also be used.

Figure 4:
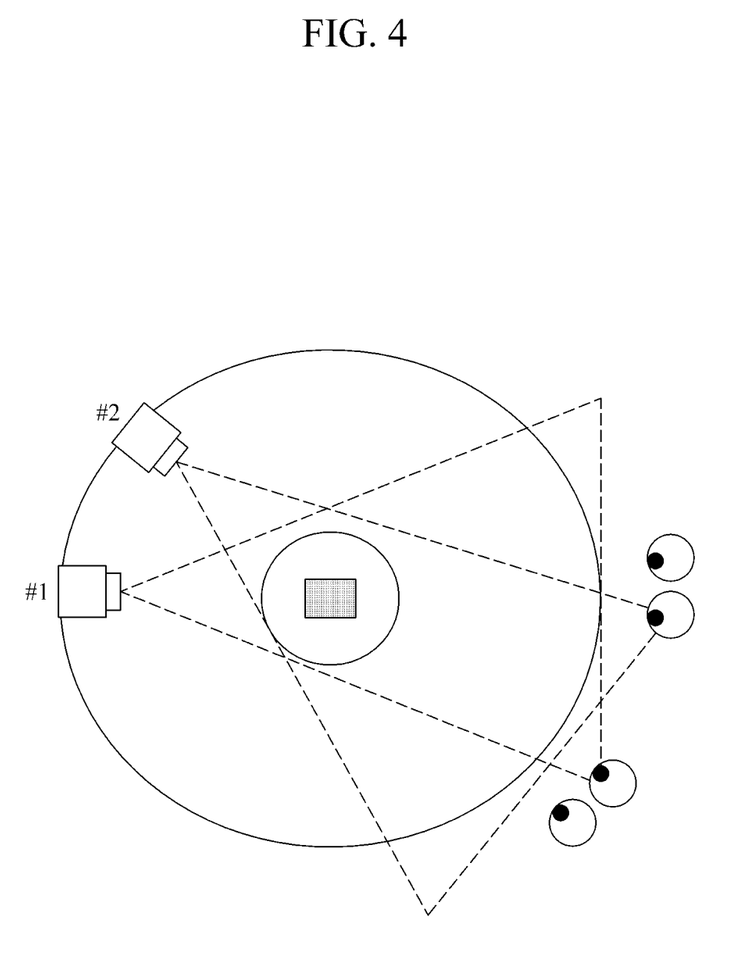
FIG. 4 is a diagram illustrating an example of camera arrangement to explain a process of generating 3D coordinates of pupils.

FIG. 4 is a diagram illustrating an example of camera arrangement to explain a process of generating 3D coordinates of pupils.

Referring to FIGS. 2 and 4, the coordinate calculator 228 may calculate 3D coordinates of pupils by using channel information selected by the channel determiner 224 and pupil position information calculated by the pupil tracker 226. The channel information may provide information on the position of cameras that input channel images. In a stereo camera setup, a distance between cameras and an observer and a position of pupils may be calculated by using a disparity between pupils captured by two adjacent cameras.

There is a disparity in 3D positions of pupils tracked in channel images captured by the two adjacent cameras. The coordinate calculator 228 may obtain a specific 3D position by converting 3D coordinates of pupils on the basis of a predetermined reference point. For example, in the case where observers and cameras are arranged as illustrated in FIG. 4, a disparity occurs between 3D coordinates of pupils captured by camera 1 and 3D coordinates of pupils captured by camera 2. The coordinate calculator 228 converts 3D coordinates of pupils on the basis of the center of a table. The calculation may be performed in the same manner as a general 3D transformation. Equation 2 represents coordinates ($X_c$, $Y_c$, $Z_c$) converted, on the basis of center points of a table, from 3D coordinates (X', Y', Z') captured by the cameras.

The 3D coordinates calculated by the coordinate calculator 228 are transmitted to the display 24. The display 24 may generate a digital holographic image according to the calculated position of an observer's pupils.

Figure 5:
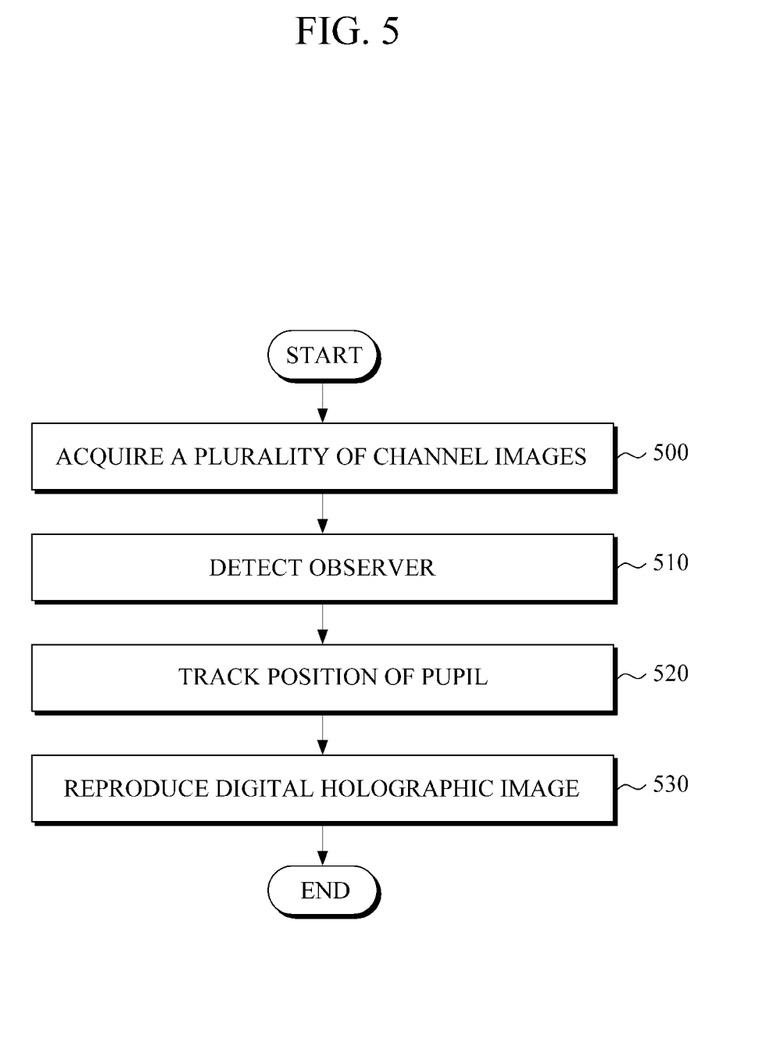
FIG. 5 is a flowchart illustrating a digital holographic image display method according to an exemplary embodiment.

FIG. 5 is a flowchart illustrating a digital holographic image display method according to an exemplary embodiment.

Referring to FIGS. 2 and 5, a display device 2 acquires in 500 a plurality of channel images in an omni-directional range from a table by using a camera array 20 that includes a plurality of cameras 200-1, 200-2, . . . , and 200-n. By arranging the plurality of cameras 200-1, 200-2, . . . , and 200-n included in the camera array 20 in a circle toward the center of a table, images may be captured around 360 degrees.

Subsequently, the display device 2 generates one multi-grid image by combining channel images captured by the plurality of cameras 200-1, 200-2, . . . , and 200-n. Then, at least one observer is detected from the multi-grid image in 510. In the detection of an observer in 510, location information on an additional channel area may be extracted from at least one channel area, from which the observer is detected, in the multi-grid image. The location information on an additional channel area may be a face area, or a face area and an eye area.

Then, the display device 2 selects channels regarding channel areas from which an observer is detected, and the position of pupils is tracked in the channel images in 520 associated with the selected channels.

Next, a 3D position of pupils is calculated by using location information of the tracked pupils and the channel information, to reproduce a digital holographic image in a 3D space according to the calculated 3D position of pupils in 530. When the 3D position is calculated, specific 3D coordinates may be obtained by calculating 3D coordinates of pupils tracked in channel images captured by two adjacent stereo cameras, and by converting the calculated 3D coordinates of pupils on the basis of predetermined reference information. In reproducing a digital holographic image in 530, a viewing window is formed by controlling a beam direction to be directed to the calculated 3D position of pupils, and a digital holographic image may be reproduced through the formed viewing window.

As described above, in the digital holographic table top display, pupils of an observer may be detected accurately in a 3D space by using a plurality of cameras, and a digital holographic image may be reproduced in the 3D space according to the detected position of the pupils, thereby overcoming a limited field of view.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. A digital holographic table top display apparatus, comprising:
   a camera array configured to capture a plurality of channel images in an omni-directional range from a table by using a plurality of cameras;
   a controller configured to detect an observer from the plurality of channel images and to track a position of pupils of the observer in at least one channel image from which the observer is detected; and
   a display configured to reproduce a digital holographic image in a three-dimensional (3D) space according to the tracked position of the pupils,
   wherein the controller comprises:
   a multi-grid image generator configured to combine the channel images captured by the plurality of cameras to generate one multi-grid image;
   an observer detector configured to detect at least one observer from the multi-grid image;
   a channel determiner configured to select a channel associated with a channel image from which the observer is detected;
   a pupil tracker configured to track the position of the pupils in the channel image associated with information on the selected channel; and
   a coordinate calculator configured to calculate 3D coordinates of the position of the pupils by using the tracked position of the pupils and the information on the selected channel.

2. The apparatus of claim 1, wherein the camera array of the plurality of cameras is arranged in a circle toward a center of the table to acquire images around 360 degrees.

3. The apparatus of claim 1, wherein the observer detector extracts location information on an additional channel area from the multi-grid image having the at least one channel image from which the observer is detected, and transmits the extracted location information on the additional channel area along with the channel information to the channel determiner.

4. The apparatus of claim 3, wherein the location information on the additional channel area is location information on a face area or location information on a face area and an eye area.

5. The apparatus of claim 1, wherein with respect to one multi-grid image having the at least one channel image from which an observer is detected, the channel determiner transmits, to the pupil tracker, an original channel image captured by the plurality of cameras, or an enlarged image from the at least one channel image.

6. The apparatus of claim 1, wherein the coordinate calculator calculates 3D coordinates of the position of each of the pupils tracked in the channel images captured by two adjacent stereo cameras, and converts the calculated 3D coordinates of the position of each of the pupils on the basis of a predetermined reference point.

7. The apparatus of claim 6, wherein the predetermined reference point is the center of the table.

8. The apparatus of claim 1, wherein the display comprises an optical device configured to form a viewing window by controlling a direction of a beam to be directed to the position of the pupils tracked by the controller, and to reproduce the digital holographic image through the formed viewing window.

9. A digital holographic table top display method, comprising:
- capturing a plurality of channel images in an omnidirectional range from a table by using a camera array that includes a plurality of cameras;
- detecting an observer from the plurality of channel images and tracking a position of pupils of the observer in at least one channel image from which the observer is detected; and
- reproducing a digital holographic image in a three-dimensional (3D) space according to the tracked position of the pupils,
- wherein the tracking of the position of the pupils comprises:
- generating one multi-grid image by combining the channel images captured by the plurality of cameras;
  - detecting at least one observer from the multi-grid image; and
- selecting a channel associated with a channel image from which the observer is detected;
  - tracking the position of the pupils in the channel image associated with information on the selected channel; and
  - calculating 3D coordinates of the position of the pupils by using the tracked position of the pupils and the information on the selected channel.

10. The method of claim 9, wherein the capturing of the plurality of channel images comprises capturing images around 360 degrees by using the camera array that includes the plurality of cameras arranged in a circle toward a center of the table.

11. The method of claim 9, wherein the detecting of the observer comprises:
- extracting location information on an additional channel area from the multi-grid image having the at least one channel image from which the observer is detected; and
- transmitting the extracted location information on the additional channel area along with the channel information.

12. The method of claim 9, wherein the selecting of the channel comprises:
- with respect to one multi-grid image having the at least one channel image from which the observer is detected, transmitting an original channel image captured by the plurality of cameras, or an enlarged image from the at least one channel image.

13. The method of claim 9, wherein the calculating of the 3D coordinates comprises:
- calculating the 3D coordinates of the position of each of the pupils tracked in the channel images captured by two adjacent stereo cameras; and
- converting the calculated 3D coordinates of the position of each of the pupils on the basis of a predetermined reference point.

14. The method of claim 9, wherein the reproducing of the digital holographic image comprises:
- forming a viewing window by controlling a direction of a beam to be directed to the position of the pupils tracked by the controller; and
- reproducing the digital holographic image through the formed viewing window.

\* \* \* \* \*